United States Patent
Kuga

(10) Patent No.: US 10,162,549 B2
(45) Date of Patent: Dec. 25, 2018

(54) INTEGRATED CIRCUIT CHIP AND METHOD THEREFOR

(71) Applicant: CANON KABUSHIKI KAISHA, Tokyo (JP)

(72) Inventor: Takeshi Kuga, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 95 days.

(21) Appl. No.: 15/150,518

(22) Filed: May 10, 2016

(65) Prior Publication Data

US 2016/0350024 A1   Dec. 1, 2016

(30) Foreign Application Priority Data

May 26, 2015 (JP) .................... 2015-106731

(51) Int. Cl.
*G06F 12/02* (2006.01)
*G06F 3/06* (2006.01)
*G06F 13/28* (2006.01)
*G06F 13/40* (2006.01)

(52) U.S. Cl.
CPC .......... *G06F 3/0632* (2013.01); *G06F 3/0604* (2013.01); *G06F 3/0685* (2013.01); *G06F 13/28* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 2003/0074495 A1* | 4/2003 | Lee | ................. | G06F 13/122 710/10 |
| 2010/0088503 A1* | 4/2010 | Eto | ................. | G06F 1/30 713/100 |
| 2011/0228327 A1* | 9/2011 | Maeda | ................. | G06K 15/406 358/1.15 |
| 2016/0109515 A1* | 4/2016 | Sharda | ................. | G01R 31/31705 714/729 |

FOREIGN PATENT DOCUMENTS

JP        2002-099517 A        4/2002

* cited by examiner

*Primary Examiner* — Edward J Dudek, Jr.
*Assistant Examiner* — Ryan Dare
(74) *Attorney, Agent, or Firm* — Venable LLP

(57) ABSTRACT

In an apparatus including a plurality of integrated circuit chips, it makes it possible not to connect a ROM to all integrated circuit chips. Each chip incorporates a processor, and has terminal for connecting with a ROM and a RAM. The chip includes a communication unit communicating with another integrated circuit chip, and a reset controller which includes a register storing initial data setting for the processor in a reset state, and selects, based on a logical level of an external terminal, between whether to provide the data of the register to a reset terminal of the processor and whether to provide an external signal to the reset terminal of the processor.

14 Claims, 15 Drawing Sheets

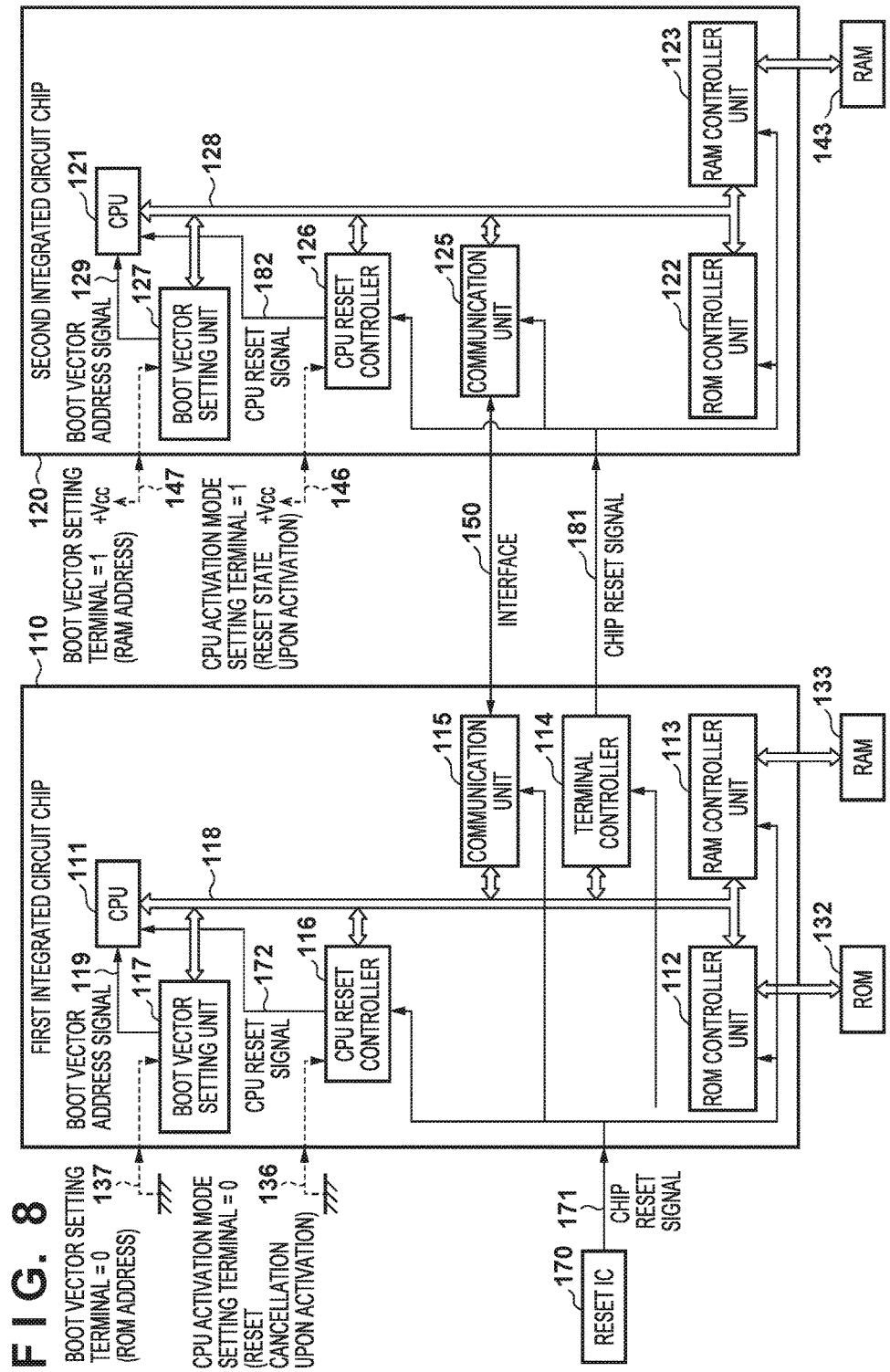
F I G. 8

INTEGRATED CIRCUIT CHIP AND METHOD THEREFOR

BACKGROUND OF THE INVENTION

Field of the Invention

The present invention relates to an integrated circuit chip and a method therefore.

Description of the Related Art

In recent years, along with complication of an apparatus, the apparatus is often constituted of a plurality of integrated circuit chips. This is for the purpose of performing parallel processing by the plurality of integrated circuit chips. However, each integrated circuit chip needs a ROM which stores programs and a RAM which stores in-process data temporarily to operate a CPU in the integrated circuit chip.

To deal with such a situation, a cost reduction by decreasing the number of components which constitute the apparatus is important. There is a technique of eliminating the ROM of the other integrated circuit chip by transmitting the programs from one integrated circuit chip to the other integrated circuit chip. Japanese Patent Laid-Open No. 2002-99517 (to be referred to as literature 1 hereinafter) discloses this technique.

In literature 1, a master chip and a slave chip are manufactured individually in accordance with their functions.

However, costs and man-hours required for development may be increased by manufacturing the master chip and the slave chip individually as described above. To cope with this, identical chips can form chips which play roles of a master and a slave. However, the role of the chip as the master or the slave is decided at the time of manufacture. In literature 1, a chip manufactured as the master chip exhibits its function only as the master. It is therefore impossible to decide its operation contents depending on the set role as described above.

SUMMARY OF THE INVENTION

The present invention has been made in consideration of the above problem. According to an aspect of the invention, there is provided an integrated circuit chip which incorporates a processor, and can be connected to a ROM and a RAM, the chip comprising: a communication unit configured to communicate with another integrated circuit chip; and a reset controller which includes a register storing initial data for setting the processor in a reset state, and is configured to select, based on a logical level of an external terminal, processing to be performed between a first processing to provide the data of the register to a reset terminal of the processor and a second processing to provide an external signal to the reset terminal of the processor.

According to the invention, a ROM need not be connected to all integrated circuit chips even if an apparatus including the plurality of integrated circuit chips of the present invention is formed. This makes it possible to reduce a development cost or a manufacturing cost of the apparatus.

Further features of the present invention will become apparent from the following description of exemplary embodiments (with reference to the attached drawings).

BRIEF DESCRIPTION OF THE DRAWINGS

FIG. 8 is a block diagram showing the arrangement of an information processing system according to the third embodiment;

DESCRIPTION OF THE EMBODIMENTS

Embodiments according to the present invention will be described in detail below with reference to the accompanying drawings.

[First Embodiment]

Figure 1:
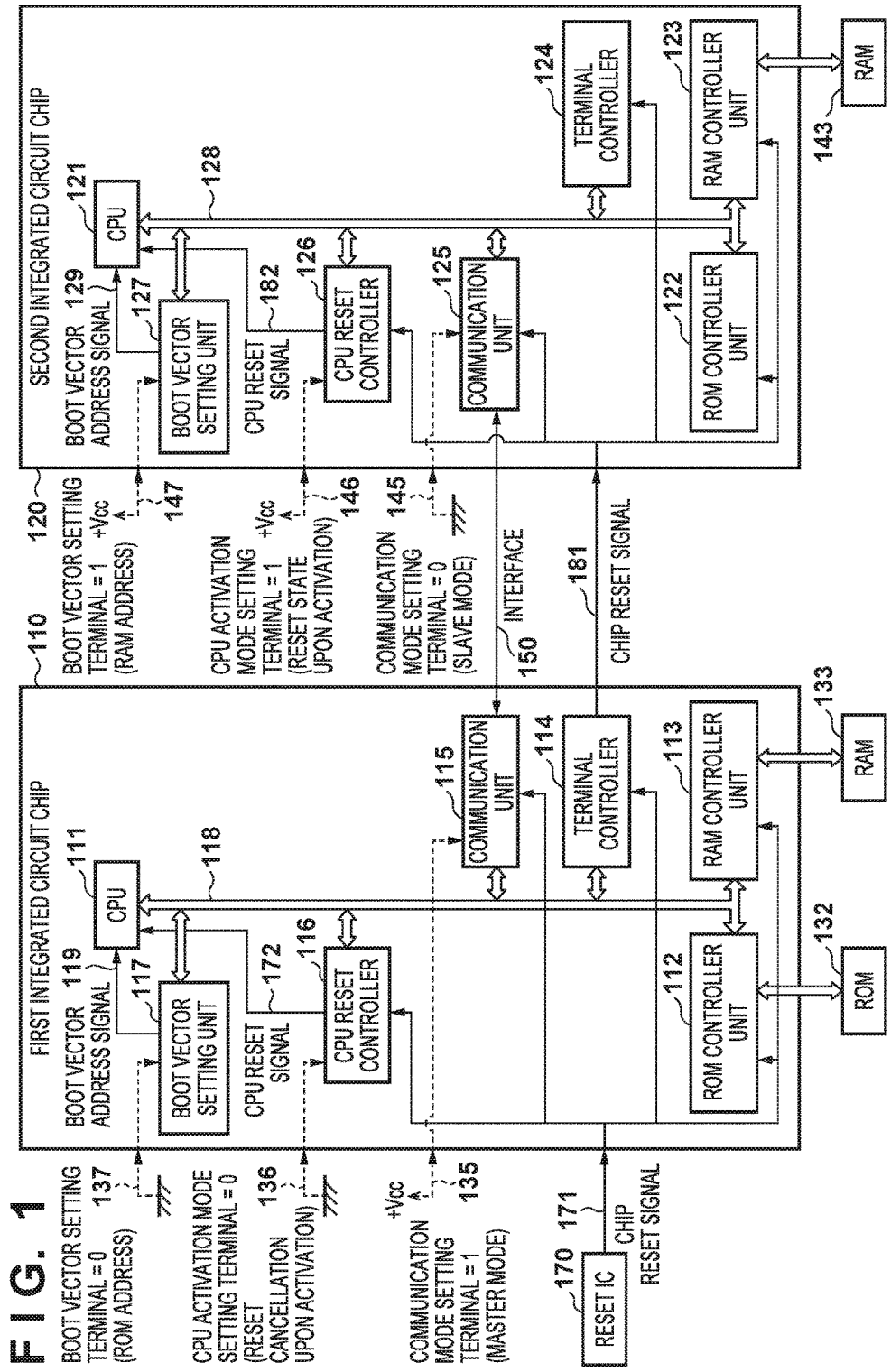
FIG. 1 is a block diagram showing the arrangement of an information processing system according to the first embodiment.

FIG. 1 is a block diagram showing the arrangement of an information processing system (or an information processing apparatus) according to the first embodiment. This system includes a plurality of integrated circuit chips which can be processed in parallel to each other and have the same circuit arrangement. More specifically, this system includes a first integrated circuit chip 110 and a second integrated circuit chip 120 mounted on a substrate. Both of these chips can be connected to a ROM and RAMS. The first integrated circuit chip 110 according to this embodiment is connected to a ROM 132 and a RAM 133. However, the second integrated circuit chip 120 is not connected to the ROM while it is connected to a RAM 143. This is for the purpose of decreasing the number of articles connected to the second integrated circuit chip. A reset IC 170 for providing a chip reset signal line is also connected to the first integrated circuit chip 110 of this system. The first integrated circuit chip 110 and the second integrated circuit chip 120 are connected by an interface 150 in order to perform communication. The interface 150 may be a serial interface or a parallel interface. A chip reset signal line 181 is provided between the first integrated circuit chip 110 and the second integrated circuit chip 120 to cause the first integrated circuit chip 110 to reset the second integrated circuit chip 120.

An apparatus which includes this information processing system is not particularly limited. However, a printing apparatus can be taken as an example. The recording resolution of a recent printing apparatus keeps on increasing, and thus the amount of data to be handled becomes enormous. It is therefore possible to seek the distribution of a processing burden by implementing reception processing of print data, and print processing such as driving of a printhead related to printing and conveyance of a printing sheet in separate integrated circuits.

The first integrated circuit chip 110 and the second integrated circuit chip 120 have the same arrangement. Therefore, reference numerals 111 to 119 in the first integrated circuit chip 110 and reference numerals 121 to 129 in the second integrated circuit chip 120 are the same. The first integrated circuit chip 110 includes terminals 135 to 137. The second integrated circuit chip 120 also includes the same terminals 145 to 147.

First, the first integrated circuit chip 110 will be described. The first integrated circuit chip 110 incorporates the CPU (or the processor) 111. This first integrated circuit chip 110 also includes the ROM controller unit 112, the RAM controller unit 113, the terminal controller 114, the communication unit 115, the CPU reset controller 116, and the boot vector setting unit 117. The first integrated circuit chip 110 further includes the communication mode setting terminal 135, the CPU activation mode setting terminal 136, and the boot vector setting terminal 137. The CPU reset controller 116 and the CPU 111 are connected by a CPU reset signal line 172. The boot vector setting unit 117 and the CPU 111 are connected by the boot vector address signal line 119. The main bus 118 for connecting the above-described components is provided in the first integrated circuit chip 110.

Note that in a description below, reference numerals of the signal lines are used as reference numerals indicating signals themselves, for the sake of simplicity. For example, outputting a reset signal on the CPU reset signal line 172 by the CPU reset controller 116 to reset the CPU 111 is expressed as providing the CPU reset signal line 172 to the CPU 111 by the CPU reset controller 116.

The CPU 111 is a process execution means for controlling the information processing system in accordance with programs. The ROM controller unit 112 controls data readout from the ROM 132. The ROM 132 stores, for example, the programs executed by the CPU 111. The RAM controller unit 113 controls readout/write of data from/in the RAM 133. The RAM 133 stores programs being executed or temporal data such as image data being processed. The terminal controller 114 is one of I/Os which controls the chip reset signal 181 of the second integrated circuit chip 120. The communication unit 115 communicates with the second integrated circuit chip 120 via the interface 150. In addition, the communication unit 115 functions as a bus master. The CPU reset controller 116 generates the CPU reset signal 172 of the CPU 111. The boot vector setting unit 117 generates the boot vector address signal 119 indicating an address at which the programs are read out when the CPU 111 is activated (booted). The main bus 118 can access not only from the CPU 111 but from another chip (the CPU 121 of the second integrated circuit chip 120 in this embodiment) after connection of the communication unit 115 is established. The communication mode setting terminal 135 sets the mode of the communication unit 115. The CPU activation mode setting terminal 136 sets the activation mode of the CPU reset controller 116. The boot vector setting terminal 137 sets a value for the boot vector setting unit 117 and functions as a boot/address selection unit.

The arrangement of the second integrated circuit chip 120 will now be described. The arrangement of this second integrated circuit chip 120 is the same as that of the first integrated circuit chip 110. That is, the second integrated circuit chip 120 includes the CPU 121, the ROM controller unit 122, the RAM controller unit 123, the terminal controller 124, the communication unit 125, the CPU reset controller 126, and the boot vector controller 127. The second integrated circuit chip 120 also includes the communication mode setting terminal 145, the CPU activation mode setting terminal 146, and the boot vector setting terminal 147. Reference numeral 182 denotes a CPU reset signal. Reference numeral 129 denotes the boot vector address signal.

As described above, the first integrated circuit chip 110 and the second integrated circuit chip 120 are the same in the circuit arrangement, but are different in the following respect.

That is, the ROM controller unit 112 of the first integrated circuit chip 110 is connected to the ROM and can read out the programs from the ROM. On the other hand, the ROM controller unit 122 of the second integrated circuit chip 120 is not connected to a ROM and does not (cannot) read out programs.

The respective terminals of the first integrated circuit chip 110 are set as follows. The communication mode setting terminal 135 is pulled up (terminal=1) and set in a master mode. The CPU activation mode setting terminal 136 is pulled down (terminal=0) and set in reset cancellation upon activation. The boot vector setting terminal 137 is pulled down (terminal=0) and set such that a program counter (PC) when activating the CPU 111 indicates an address of the ROM 132.

On the other hand, the respective terminals of the second integrated circuit chip 120 are set as follows. The communication mode setting terminal 145 is pulled down (terminal=0) and set in a slave mode. The CPU activation mode setting terminal 146 is pulled up (terminal=1) and set in a reset state upon activation. The boot vector setting terminal 147 is pulled up (terminal=1) and set such that a program counter when activating the CPU 121 indicates an address of the RAM 143.

In the above-described embodiment, an example has been described in which the communication mode setting terminal 135, the CPU activation mode setting terminal 136, and the boot vector setting terminal 137 of the first integrated circuit chip 110 are provided as external terminals of the integrated circuit chip. However, they may be combined to be one and the same setting terminal. Similarly, the communication mode setting terminal 145, the CPU activation mode setting terminal 146, and the boot vector setting terminal 147 of the second integrated circuit chip 120 may be combined to be the same setting terminal.

Figure 2:
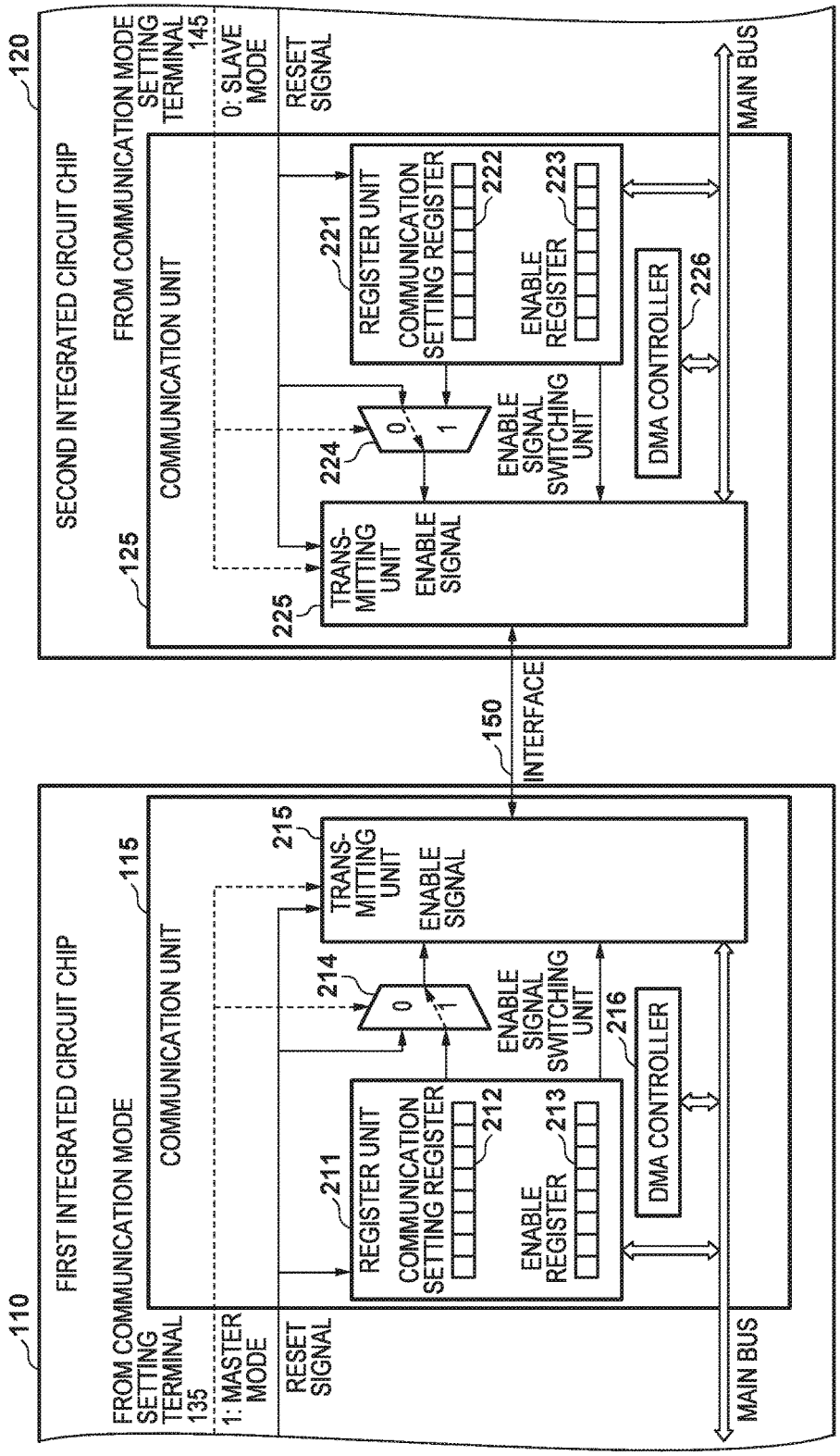
FIG. 2 is a diagram showing the arrangement of each communication unit according to the first embodiment.

FIG. 2 shows the respective arrangements of and the connection relationship between the communication unit 115 of the first integrated circuit chip 110 and the communication unit 125 of the second integrated circuit chip 120. The same reference numerals as in FIG. 1 denote the same parts and a description thereof will be omitted.

First, the arrangement of the communication unit 115 in the first integrated circuit chip 110 will be described. The communication unit 115 includes a register unit 211. This register unit 211 includes a communication setting register 212 and an enable register 213. The communication unit 115 also includes an enable signal switching unit 214, a transmitting unit 215, and a DMA controller 216. The register unit 211 performs various setting operations for the communication unit 115 to perform communication. The communication setting register 212 is a setting register for performing communication. The enable register 213 is a register which generates an enable signal for making the transmitting unit 215 communicable by the setting of the CPU 111. The enable signal switching unit 214 switches an enable signal which makes the transmitting unit 215 communicable. The transmitting unit 215 is made of a physical layer which converts an electrical signal into digital data or a transaction layer which performs a protocol analysis, packet processing, and the like. The DMA controller 216 performs data transmission between the first integrated circuit chip 110 and the second integrated circuit chip 120 by the setting of the CPU 111.

The arrangement of the communication unit 125 in the second integrated circuit chip 120 is the same as that of the communication unit 115 in the first integrated circuit chip 110. Therefore, reference numerals 221 to 226 correspond to reference numerals 211 to 216 in FIG. 2. However, the communication unit 115 of the first integrated circuit chip 110 and the communication unit 125 of the second integrated circuit chip 120 are different in the following respect.

The communication mode setting terminal 135 sets the communication unit 115 in the master mode (mode setting terminal=1). Therefore, the communication unit 115 takes the initiative in communication connection or power savings of the interface 150. Furthermore, the enable signal switching unit 214 selects a signal from the enable register 213 as an enable signal.

On the other hand, the communication mode setting terminal 145 sets the communication unit 125 of the second integrated circuit chip 120 in the slave mode (mode setting terminal=0). Therefore, the communication unit 125 does not take the initiative but has a subordinate relationship. Furthermore, the enable signal switching unit 214 selects a reset signal as an enable signal.

PCI-E (Peripheral Component Interconnect Express) is taken as an example in which such interface mode setting is required. In PCI-E, the interface is controlled as a master in a Root Complex (to be referred to as RC hereinafter) mode. On the other hand, the interface is controlled as a slave in an End Point (to be referred to as EP hereinafter) mode. An operation is performed as follows in accordance with the modes when activating the information processing system. In the RC mode, the communication speed or the like of the interface, or communication start is set by executing the programs of the CPUs. Note that the communication speed or the like needs to be set before the communication start. The setting of a base address or address conversion is further performed to an EP mode side. On the other hand, in the EP mode, a state is set in which control of the setting or the like from a RC mode side is waited.

In the first embodiment, the enable signal and the reset signal are treated as different signals. However, the enable signal may be configured to act on the transmitting unit as the reset signal without being changed and the transmitting unit may be implemented to be communicable upon reset cancellation.

Note that the DMA controllers 216 and 226 are not essential components, and thus may not be mounted. The DMA controllers 216 and 226 may also be mounted outside the communication units 115 and 125.

Figure 3:
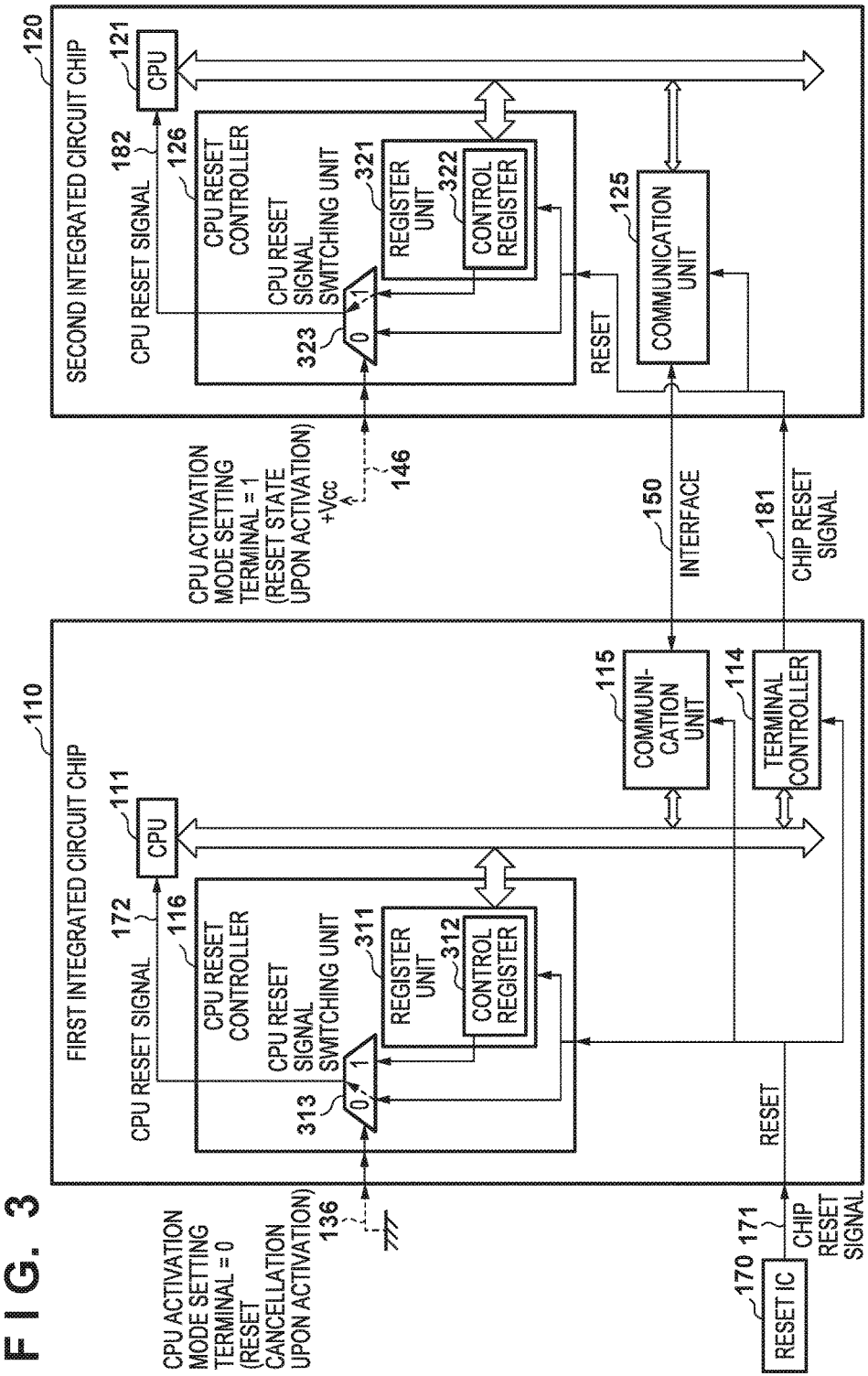
FIG. 3 is a diagram showing the arrangement of each CPU reset controller according to the first embodiment.

FIG. 3 shows the respective arrangements of and the connection relationship between the CPU reset controller 116 of the first integrated circuit chip 110 and the CPU reset controller 126 of the second integrated circuit chip 120. The same reference numerals as in FIG. 1 denote the same parts and a description thereof will be omitted.

First, the arrangement of the CPU reset controller 116 in the first integrated circuit chip 110 will be described. The CPU reset controller 116 includes a register unit 311. This register unit 311 includes a control register 312 and stores, at the time of power-on, a value of a logical level indicating a reset state for the CPU 111. For example, the control register 312 stores 0 as an initial value when the reset terminal of the CPU 111 is negative logic. A CPU reset signal switching unit 313 switches between a chip reset signal 171 and a CPU reset signal generated in the control register 312.

The arrangement of the CPU reset controller 126 in the second integrated circuit chip 120 is the same as that of the CPU reset controller 116 in the first integrated circuit chip 110. However, the CPU reset controller 116 of the first integrated circuit chip 110 and the CPU reset controller 126 of the second integrated circuit chip 120 are different in the following respect.

The CPU activation mode setting terminal 136 sets the CPU reset controller 116 in reset cancellation upon activation (mode setting terminal=0). The CPU reset signal switching unit 313 selects a signal from the chip reset signal 171 as the CPU reset signal 172. On the other hand, the CPU activation mode setting terminal 146 sets the CPU reset controller 126 in the reset state upon activation (mode setting terminal=1). A CPU reset signal switching unit 323 selects a signal from a control register 322 as the CPU reset signal 182.

Figure 4:
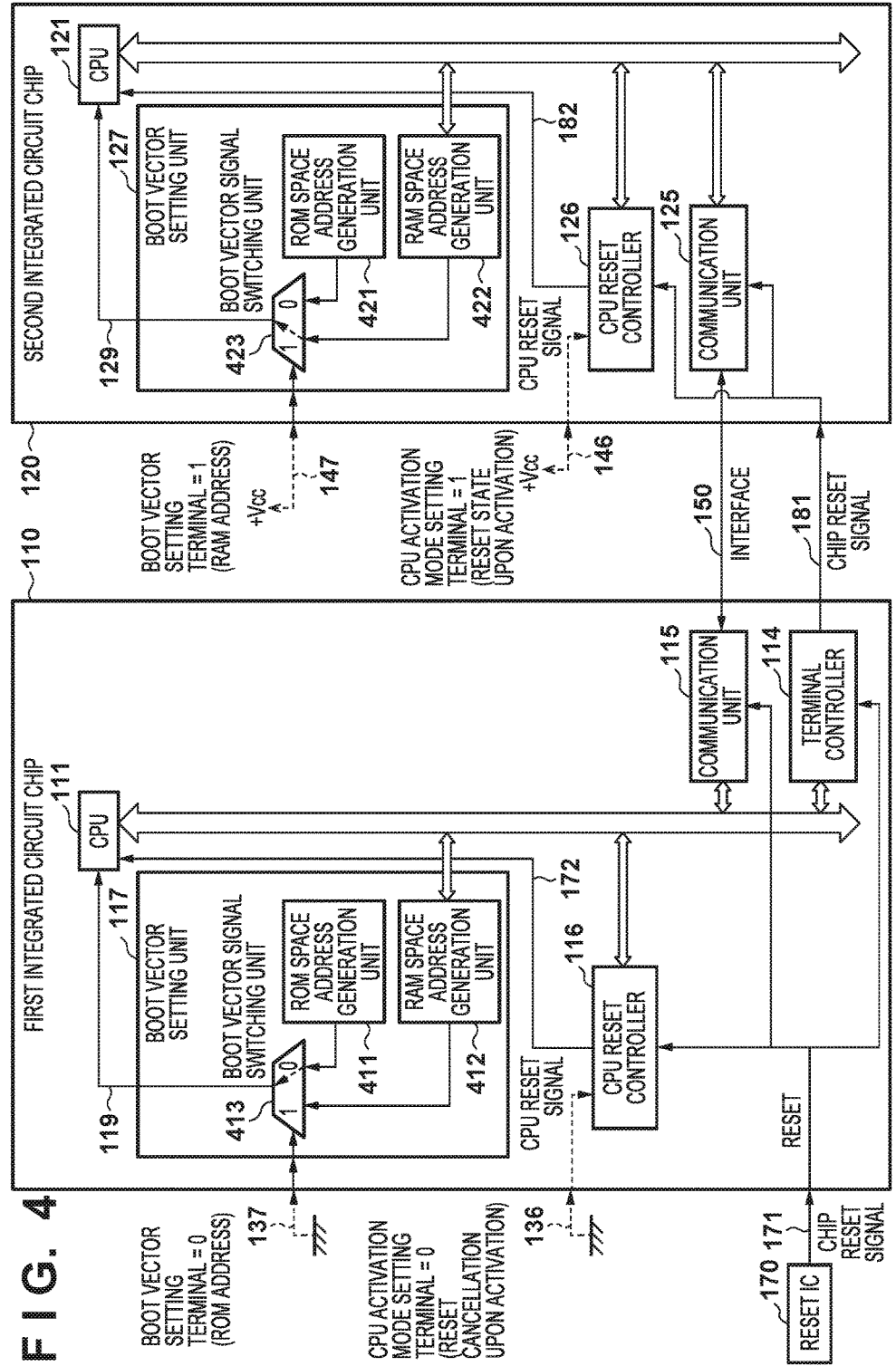
FIG. 4 is a diagram showing the arrangement of each boot vector setting unit according to the first embodiment.

FIG. 4 shows the arrangements of and the connection relationship between the boot vector setting unit 117 of the first integrated circuit chip 110 and the boot vector controller 127 of the second integrated circuit chip 120. The same reference numerals as in FIG. 1 denote the same parts and a description thereof will be omitted.

First, the arrangement of the boot vector setting unit 117 in the first integrated circuit chip 110 will be described. The boot vector setting unit 117 includes a ROM space address generation unit 411, a RAM space address generation unit 412, and a boot vector signal switching unit 413. The ROM space address generation unit 411 indicates an address at which a ROM region out of a memory space is mapped. On the other hand, the RAM space address generation unit 412 indicates an address at which the RAM out of a memory space is mapped. The RAM space address generation unit 412 can be set by access of the CPU 111 from the memory space. The boot vector signal switching unit 413 switches between an address value from the ROM space address generation unit 411 and an address value from the RAM space address generation unit 412, thereby outputting the switched address value as a boot vector signal.

The arrangement of the boot vector controller 127 in the second integrated circuit chip 120 is the same as that of the boot vector setting unit 117 in the first integrated circuit chip 110. However, the boot vector setting unit 117 of the first integrated circuit chip 110 and the boot vector controller 127 of the second integrated circuit chip 120 are different in the following respect.

The boot vector setting terminal 137 selects a ROM address (mode setting terminal=0) for the boot vector setting unit 117. Therefore, the address value from the ROM space address generation unit 411 is transmitted to the CPU 111 as a boot vector address value. On the other hand, the boot vector setting terminal 147 selects a RAM address (mode setting terminal=1) for the boot vector setting unit 127.

Therefore, an address value from a RAM space address generation unit 422 is transmitted to the CPU 121 as a boot vector address value.

The arrangement has been described in which the RAM space address generation units 412 and 422 can be accessed from the memory spaces. However, the present invention can also be implemented by an arrangement of a fixed value in which the RAM space address generation units 412 and 422 cannot be accessed from the memory spaces.

Figure 5:
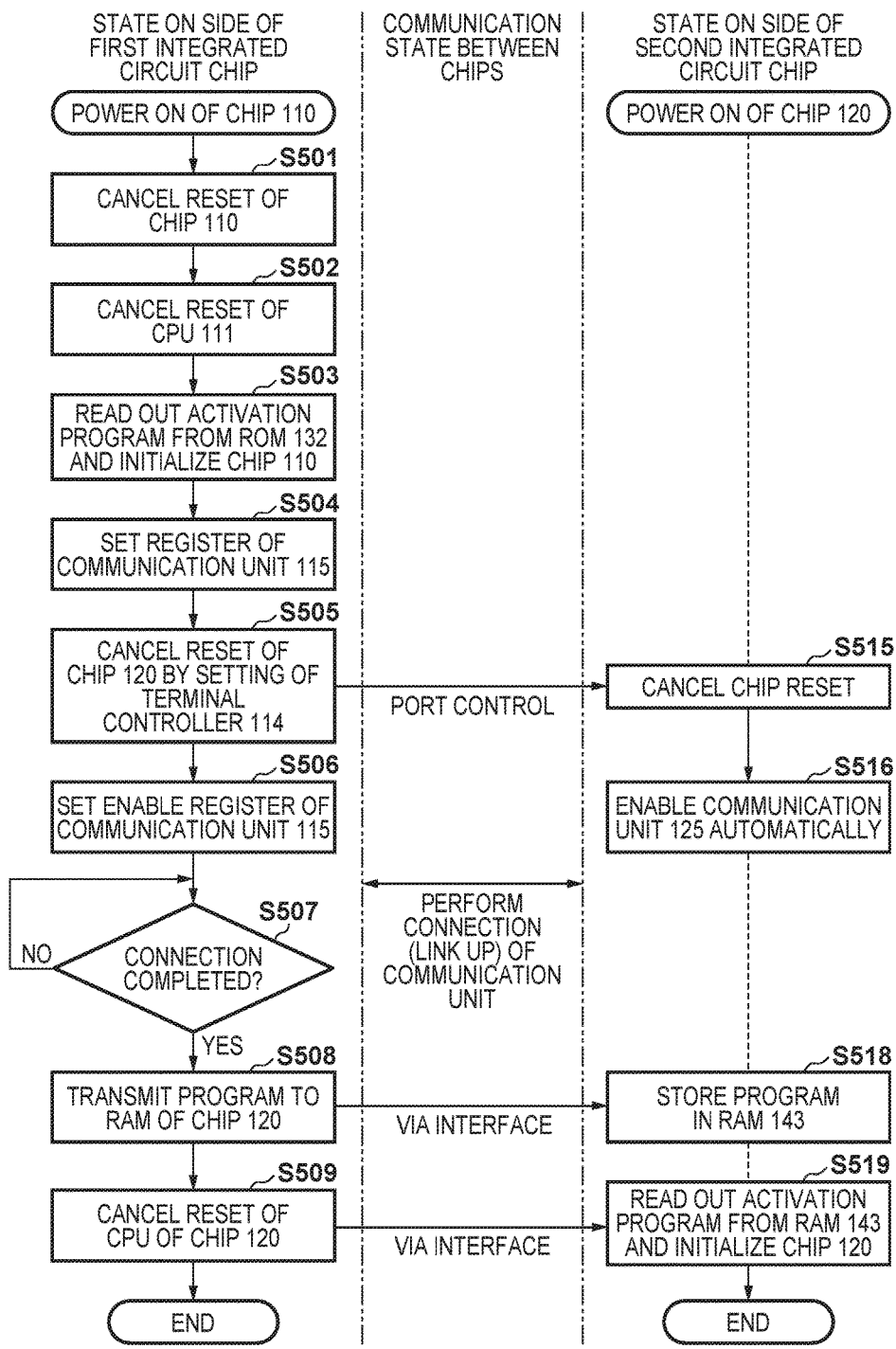
FIG. 5 is a flowchart showing a process of the information processing system according to the first embodiment.

FIG. 5 is a flowchart showing the processing procedure of the information processing system according to the first embodiment. A sequence at the time of an activation process of the information processing system of the first embodiment will be described below with reference to FIG. 5.

When the information processing system of the first embodiment is powered on, the reset IC 170 cancels reset of the first integrated circuit chip 110 in step S501. Note that at this time, the second integrated circuit chip 120 is set in a reset state by the chip reset signal 181 output by the terminal controller 114 of the first integrated circuit chip.

Further, in the first integrated circuit chip 110, the master mode is set by the communication mode setting terminal 135 and the communication unit 115 is not enabled. Furthermore, reset cancellation upon activation is set by the CPU activation mode setting terminal 136, and thus the CPU reset controller 116 cancels the CPU reset signal 172. As a result, reset of the CPU 111 is canceled in step S502. A process will be performed under control of the CPU 111 from step S503.

In step S503, in accordance with the ROM address output by the boot vector setting unit 117, the CPU 111 reads out an activation program stored in the ROM 132, and then initializes the first integrated circuit chip. Then, the CPU 111 sets a register of the communication unit 115 in step S504.

In step S505, the CPU 111 accesses the terminal controller 114 and cancels reset of the second integrated circuit chip 120 by a setting. As a result, chip reset of the second integrated circuit chip 120 is canceled in step S515. At this time, in the second integrated circuit chip 120, the slave mode is set by the communication mode setting terminal 145 and the communication unit 125 is enabled (step S516). Further, the reset state upon activation is set by the CPU activation mode setting terminal 146, and thus the CPU reset controller 126 does not cancel the CPU reset signal 182.

In step S506, the CPU 111 connects the communication unit 125 via the communication unit 115 by setting the enable register 213 of the communication unit 115. Then, in step S507, the CPU 111 waits for connection of the communication units 115 and 125. Upon connection of the communication units 115 and 125, the CPU 111 can access the memory space and an I/O space in the second integrated circuit chip 120 freely. Therefore, the CPU 111 can also access, via the communication unit 115, the RAM controller unit 123, the CPU reset controller 126, and the like in the second integrated circuit chip 120.

In step S508, the CPU 111 transmits the program for the second integrated circuit chip 120 stored in the ROM 132 of the first integrated circuit chip 110 to the RAM 143 of the second integrated circuit chip 120. As a result, in step S518, the RAM controller unit 123 of the second integrated circuit chip 120 stores the program received via the communication unit 125 in the RAM 143. Note that this program transmission is preferably performed by a method of transmitting the program by DMA transmission using the DMA controllers 216 and 226. That is, the CPU 111 sets various parameters for the DMA controller 226 in the communication unit 125 in the second integrated circuit chip 120 in addition to the DMA controller 216 in the communication unit 115 of itself, and then causes them to perform the transmission. The DMA controllers 216 and 226 function as bus masters. Therefore, for example, even if the CPU 121 of the second integrated circuit chip 120 is set in the reset state, the DMA controller 226 can store the program that has been transmitted from the first integrated circuit chip in the RAM 143 via the RAM controller unit 123. Note that in step S508, the program may be transmitted to the RAMS 143 after being loaded from the ROM 132 to the RAM 133.

After the program transmission is completed, in step S509, the CPU 111 accesses the CPU reset controller 126 of the second integrated circuit chip 120 via the communication unit 115 and stores data for canceling reset of the CPU in the control register 322. As a result, the CPU reset signal 182 is provided to the CPU 121, activating the CPU 121. In step S519, the CPU 121 reads out an activation program from the RAM 143 and initializes the second integrated circuit chip 120.

Note that steps S515, S516, S518, and S519 are connected by a broken line in a sense that they are states which change by control from the first integrated circuit chip 110 and do not operate actively.

In the first embodiment, in step S505 (step S515), the communication unit 125 of the second integrated circuit chip 120 is enabled by chip reset cancellation. On the other hand, in step S506, the communication unit 115 of the first integrated circuit chip 110 is enabled by control of the CPU 111. This is because the communication unit 115 with a master setting needs the setting of the communication unit in step S504 while the communication unit 125 with a slave setting can be enabled without a register setting.

Note that in order to perform the above-described control, control of step S505 can be performed before step S506 or may be performed before step S504. When the address of the program stored in the RAM 143 of the second integrated circuit chip 120 is not fixed, an address at which the program is stored in the RAM space address generation unit 422 can be set before step S509.

As described above, according to the first embodiment, while using two integrated circuit chips having the same circuit arrangement, the system can be configured in which one integrated circuit chip is mounted with the ROM 132 and the ROM 132, the other integrated circuit chip is mounted with only the RAM 143, and they operate independently of each other.

[Second Embodiment]

Figure 6:
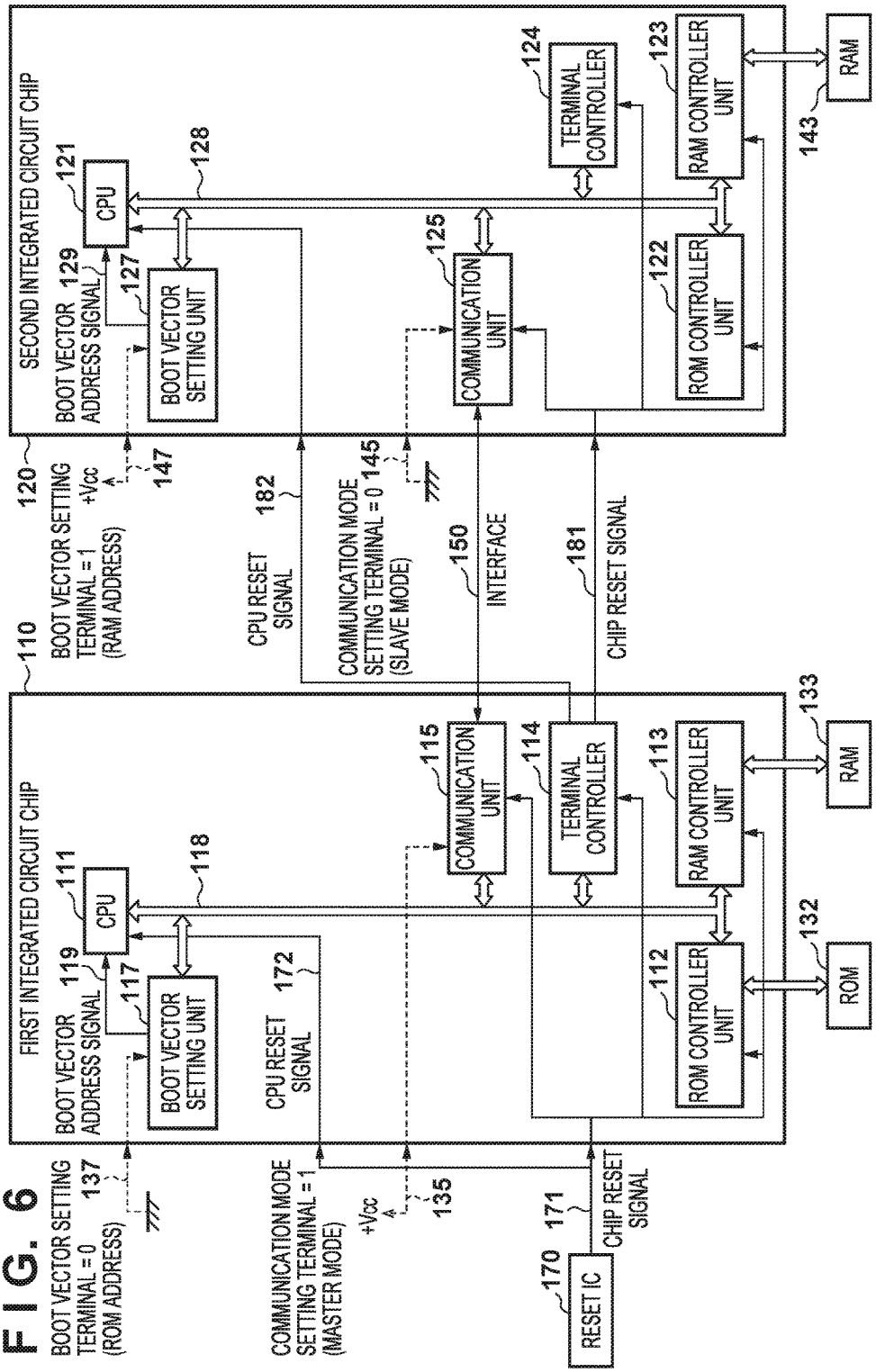
FIG. 6 is a block diagram showing the arrangement of an information processing system according to the second embodiment.

In the second embodiment, an example will be described in which a communication mode setting unit and a boot/address selection unit are used. FIG. 6 is a block diagram showing the arrangement of an information processing system according to the second embodiment. The same reference numerals as in FIG. 1 denote the same parts and a description thereof will be omitted. Therefore, a difference from the first embodiment (FIG. 1) will be described below.

In the second embodiment (FIG. 6), the CPU reset controllers 116 and 126 shown in FIG. 1 do not exist. In addition, the CPU activation mode setting terminals 136 and 146 do not exist.

On the other hand, in the second embodiment, a terminal controller 114 has a port from which a CPU reset signal 182 is output by default. Reset of a CPU 121 in a second integrated circuit chip 120 can be operated by controlling this signal.

Based on the above, a processing sequence upon activating the information processing system according to the second embodiment will be described with reference to a flowchart of FIG. 7.

Figure 7:
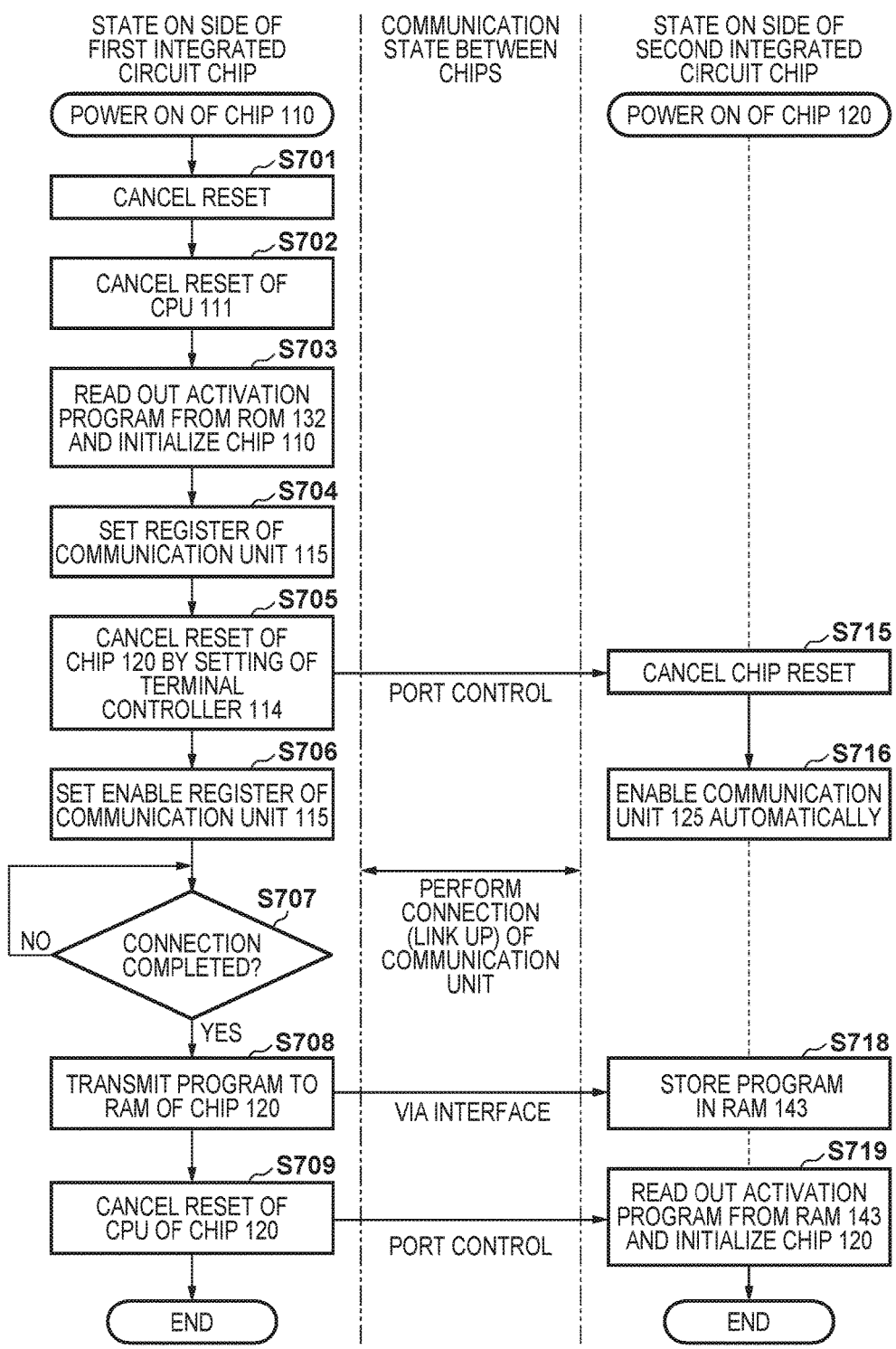
FIG. 7 is a flowchart showing the arrangement of the information processing system according to the second embodiment.

Steps S701 to S708 in FIG. 7 are the same as steps S501 to S508 in FIG. 5. Steps S715, S716, and S718 are also the same as steps S515, S516, and S518 in FIG. 5. Therefore, a description of these steps will be omitted. In step S709, a CPU 111 outputs a signal for canceling reset of the CPU 121 in the second integrated circuit chip 120 from a predetermined port of a terminal controller 114 in a first integrated circuit chip 110. As a result, in step S719, the CPU 121 in the second integrated circuit chip 120 reads out an activation program from a RAM 143 and initializes the second integrated circuit chip 120.

[Third Embodiment]

In the third embodiment, an example will be described in which an activation mode selection unit and a boot/address selection unit are used.

FIG. 8 is a block diagram showing the arrangement of an information processing system according to the third embodiment. The same reference numerals as in FIG. 1 denote the same parts and a description thereof will be omitted. Therefore, a difference from the first embodiment (FIG. 1) will be described below.

In the third embodiment, communication units 115 and 125 are implemented such that they can communicate in a setting left as its default once their reset is canceled. As an example in which such interface mode setting is required, a case is considered in which transmission is performed not by a master/slave relationship like RS-232C but only by an arbitration signal. There is also a system which decides master/slave automatically like USB On-The-Go. Assuming that such a system is used, communication mode setting terminals 135 and 145 are not needed in the third embodiment. The third embodiment is the same as the first embodiment except for this.

Figure 9:
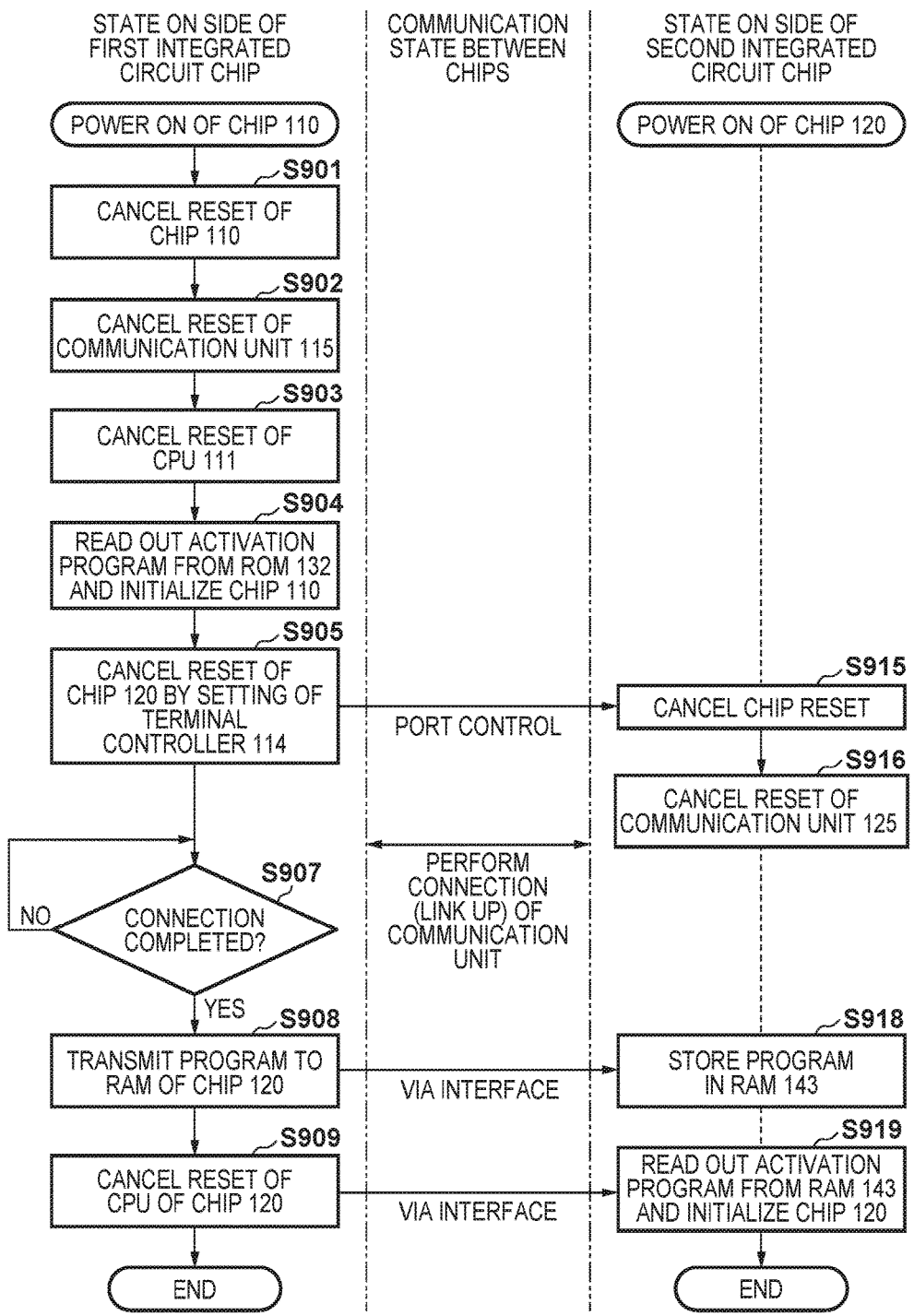
FIG. 9 is a flowchart showing a process of the information processing system according to the third embodiment.

Based on the above, a processing sequence upon activating the information processing system according to the third embodiment will be described with reference to a flowchart of FIG. 9.

When the information processing system is powered on, a reset IC 170 cancels reset of a first integrated circuit chip 110 in step S901. Then, the communication unit 115 becomes available automatically in step S902. Note that at this time, a second integrated circuit chip 120 is set in a reset state by a chip reset signal 181 output by a terminal controller 114 of the first integrated circuit chip.

Since reset cancellation upon activation is set by a CPU activation mode setting terminal 136, a CPU reset controller 116 cancels a CPU reset signal 172. As a result, reset of a CPU 111 is canceled in step S903.

In step S904, the CPU 111 reads out an activation program from a ROM address output by a boot vector setting unit 117 and executes that program, and then initializes the first integrated circuit chip.

In step S905, the CPU 111 causes the terminal controller 114 to output a signal for canceling reset of the second integrated circuit chip 120 by accessing and setting the terminal controller 114. As a result, chip reset of the second integrated circuit chip 120 is canceled in step S915. At this time, since a reset state upon activation is set by a CPU activation mode setting terminal 146, a CPU reset controller 126 does not output a CPU reset signal 182 for a CPU 121 (does not cancel reset of the CPU 121).

In step S907, the CPU 111 waits for connection to the second integrated circuit chip 120 (the communication unit 125 thereof) via the communication unit 115. When the communication units 115 and 125 are connected to each other, a memory space and an I/O space in the second integrated circuit chip 120 can be accessed freely from the CPU 111. In step S908, the CPU 111 reads out a program for the second integrated circuit chip 120 from a ROM 132 of the first integrated circuit chip 110 and transmits the program to a RAM 143 of the second integrated circuit chip 120. As a result, a RAM controller unit 123 of the second integrated circuit chip 120 stores a program received via the communication unit 125 in the RAM 143 in step S918. After the program transmission is completed, in step S909, the CPU 111 accesses the CPU reset controller 126 of the second integrated circuit chip 120 via the communication unit 115, stores a signal (data) for canceling reset of the CPU in an internal control register, and activates the CPU 121. In step S919, the CPU 121 of the second integrated circuit chip 120 reads out the activation program from the RAM 143 and initializes the second integrated circuit chip 120.

[Fourth Embodiment]

Figure 10:
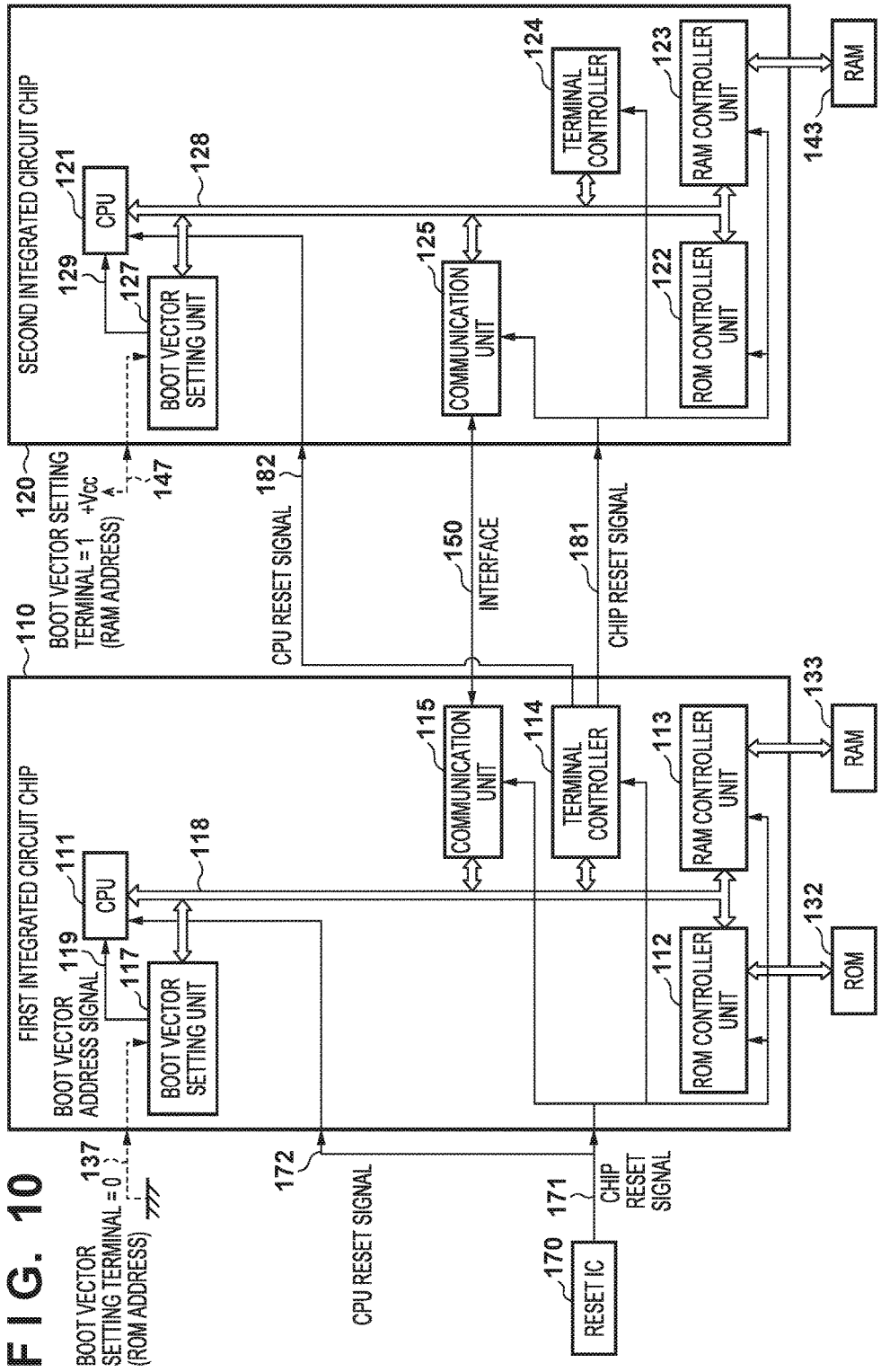
FIG. 10 is a block diagram showing the arrangement of an information processing system according to the fourth embodiment.

In the fourth embodiment, an example will be described in which only a boot/address selection unit is used. FIG. 10 is a block diagram showing the arrangement of an information processing system according to the fourth embodiment. The same reference numerals as in FIG. 1 denote the same parts and a description thereof will be omitted. Therefore, a difference from the first embodiment (FIG. 1) will be described below.

Communication mode setting terminals 135 and 145 do not exist in the system of the fourth embodiment shown in FIG. 10. In the fourth embodiment, communication units 115 and 125 are implemented such that they can communicate in an initial setting state once their reset is canceled.

Figure 11:
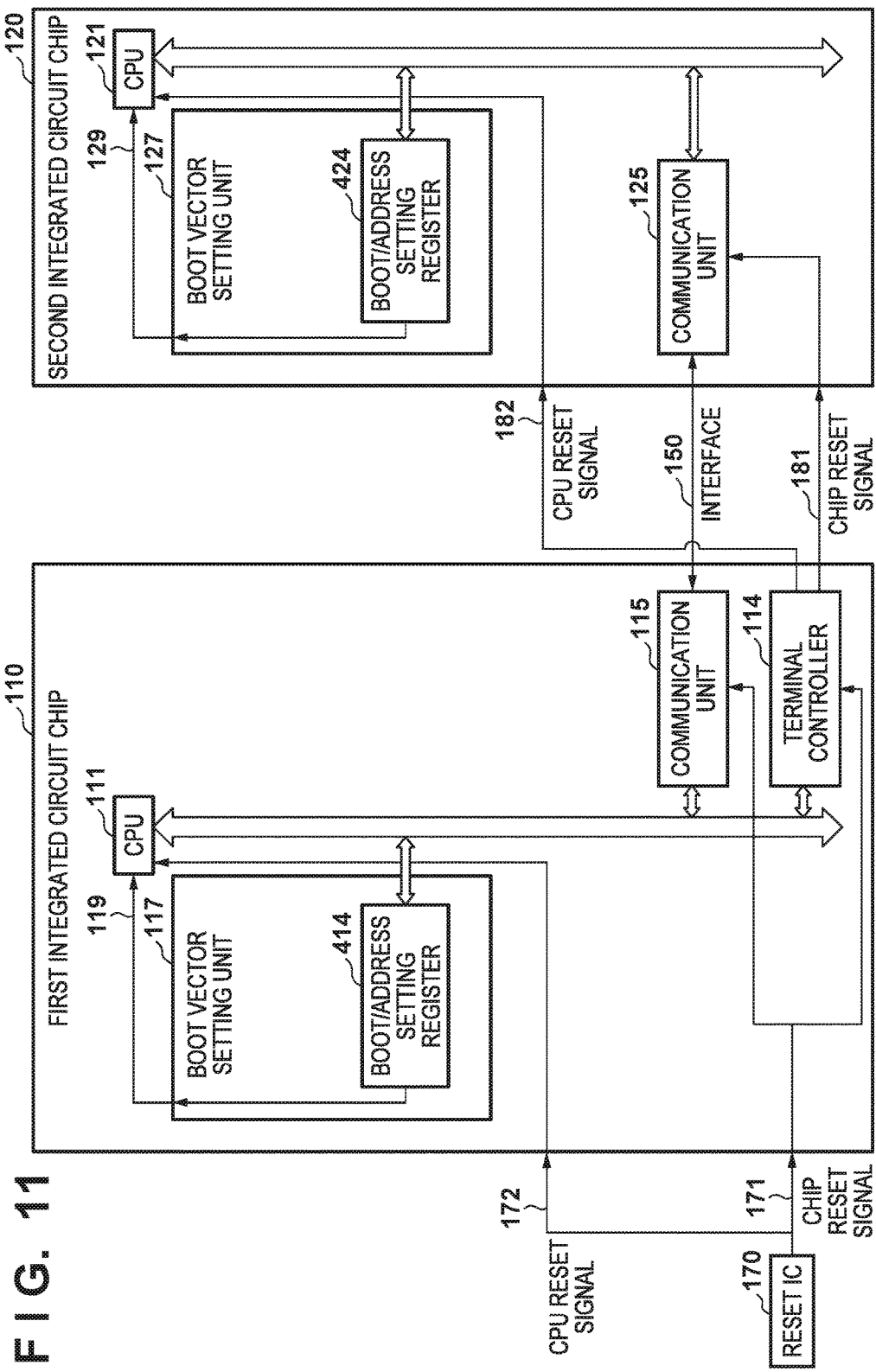
FIG. 11 is a diagram showing the arrangement of each boot vector setting unit according to the fourth embodiment.

FIG. 11 shows the arrangements of and the connection relationship between boot vector setting units 117 and 127 according to the fourth embodiment. The same reference numerals as in FIG. 4 denote the same arrangements and a description thereof will be omitted. In FIG. 11, reference numeral 414 denotes a boot/address setting register of a first integrated circuit chip 110 and reference numeral 424 denotes a boot/address setting register of a second integrated circuit chip 120.

An address value of a ROM space is set as an initial value for each of the boot/address setting registers 414 and 424. A predetermined address value can be set by write access to each boot/address setting register from a CPU. In the fourth embodiment, a CPU 111 of the first integrated circuit chip 110 sets the address value of a RAM 143 in the boot/address setting register 424, as swill be described with reference to a subsequent flowchart.

Figure 12:
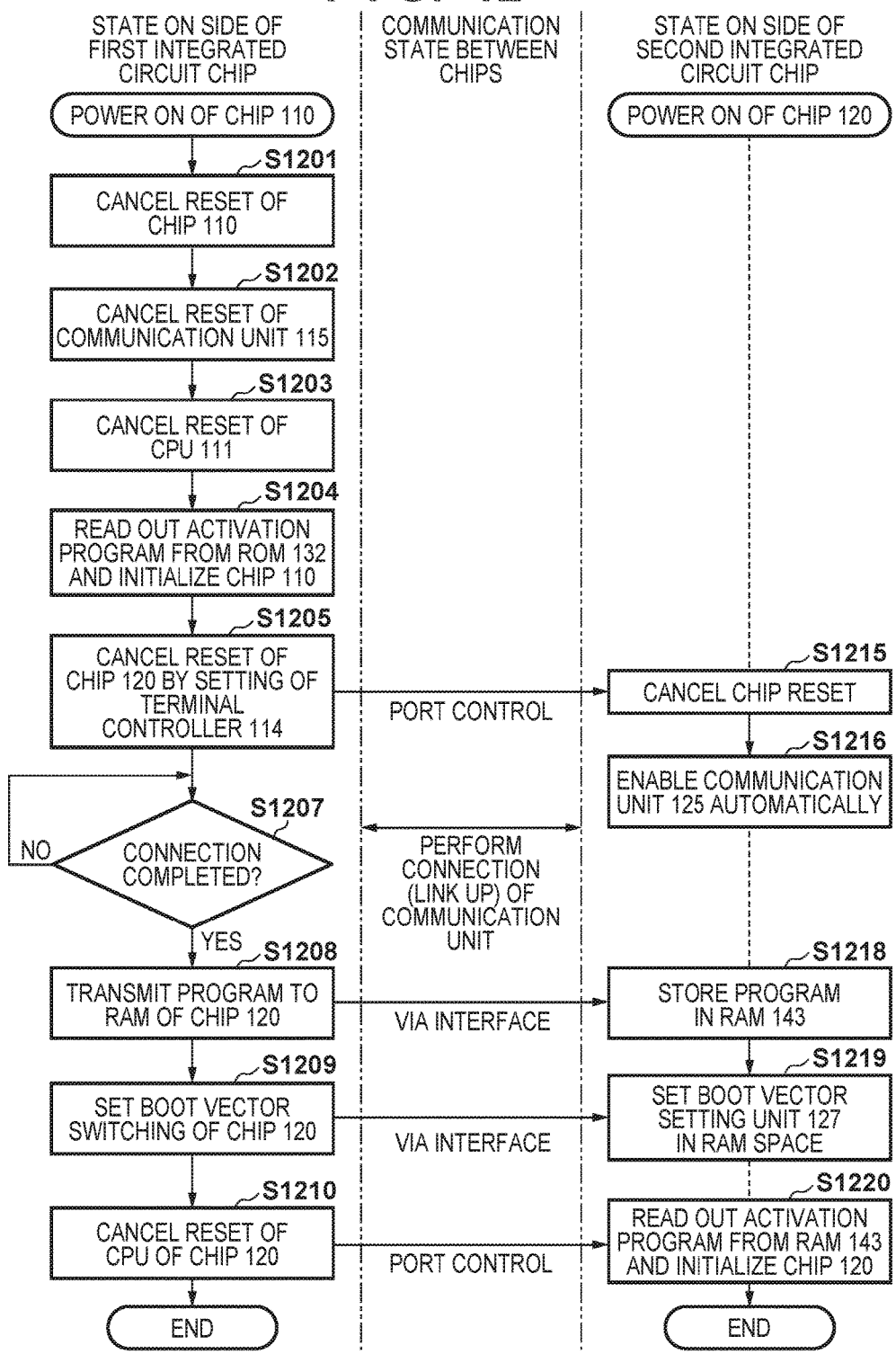
FIG. 12 is a flowchart showing a process of the information processing system according to the fourth embodiment.

Based on the above, a processing sequence upon activating the information processing system according to the fourth embodiment will be described with reference to a flowchart of FIG. 12. Steps S1201 to S1208 are the same as steps S901 to S908 in FIG. 9 of the third embodiment. Steps S1215, S1216, and S1218 are also the same as steps S515, S516, and S518 in FIG. 5. Therefore, a description of these steps will be omitted.

In step S1209, the CPU 111 of the first integrated circuit chip 110 accesses the boot vector controller 127 of the second integrated circuit chip 120 via an interface 150 and performs a process of changing an address stored in the boot/address setting register 424 to a space address value of the RAM 143. As a result, the space address of the RAM 143 is stored in the boot/address setting register 424 of the boot vector controller 127 in the second integrated circuit chip 120 (step S1219). Then, in step S1210, the CPU 111 of the first integrated circuit chip 110 outputs a signal for canceling reset of a CPU 121 in the second integrated circuit chip 120 from a predetermined port of a terminal controller 114. As a result, in step S1220, the CPU 121 of the second integrated circuit chip 120 reads out the activation program from the RAM 143 and initializes the second integrated circuit chip 120.

[Fifth Embodiment]

In each of the first to fourth embodiments described above, the example has been described in which the number of chips is two. In the fifth embodiment, however, an example will be described in which the present invention is applied to a system including three chips.

Figure 13:
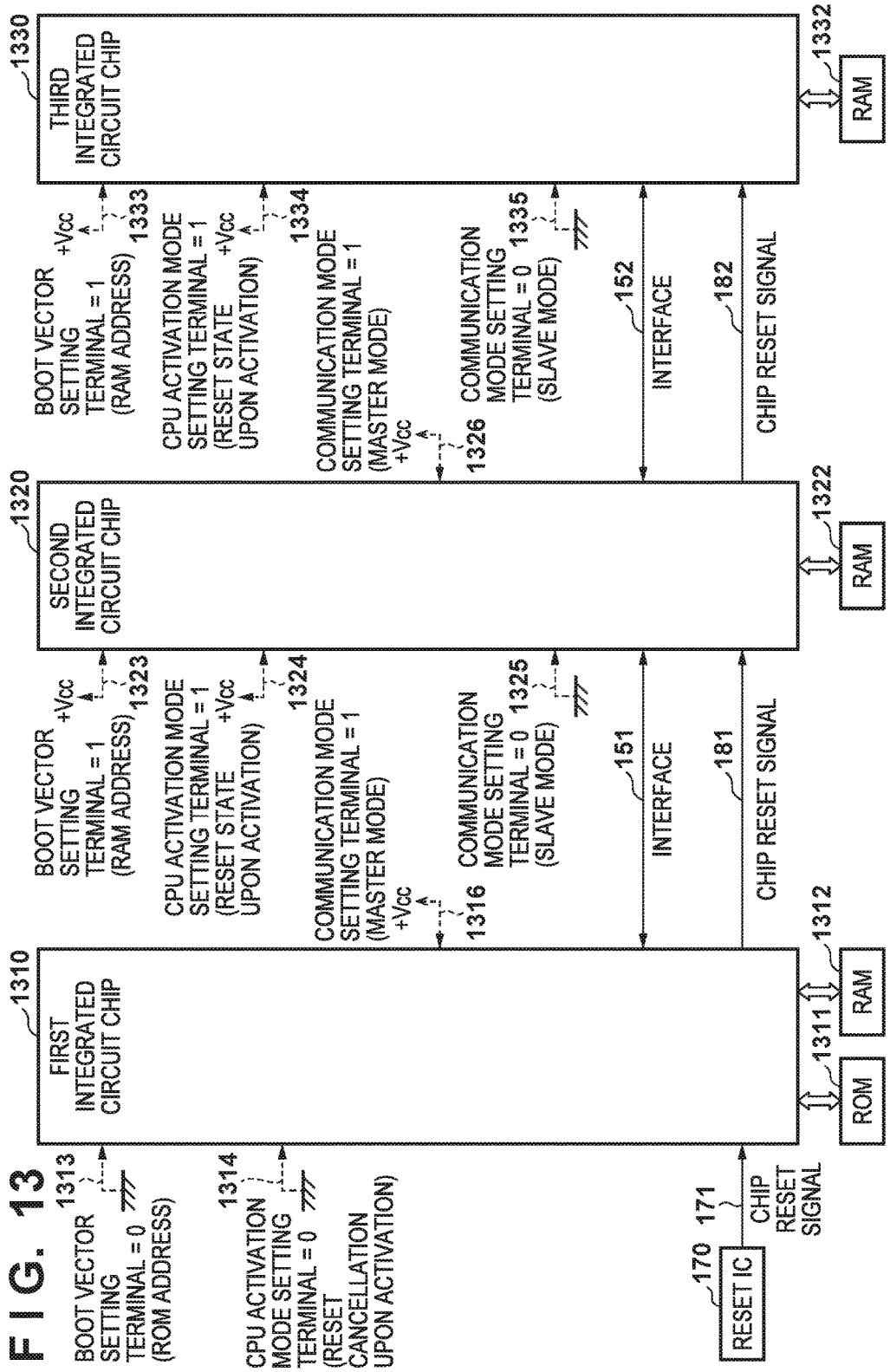
FIG. 13 is a block diagram showing the arrangement of an information processing system according to the fifth embodiment.

FIG. 13 is a block diagram showing the arrangement of an information processing system according to the fifth embodiment. This system includes a first integrated circuit chip 1310, a second integrated circuit chip 1320, and a third integrated circuit chip 1330. Reference numeral 170 denotes a reset IC. Reference numeral 171 denotes a chip reset signal of the first integrated circuit chip 1310. An interface 151 performs communication between the first integrated circuit chip 1310 and the second integrated circuit chip 1320. An interface 152 performs communication between the second integrated circuit chip 1320 and the third integrated circuit chip 1330. Reference numeral 181 denotes a chip reset signal of the second integrated circuit chip 1320. Reference numeral 182 denotes a chip reset signal of the third integrated circuit chip 1330. In the fifth embodiment, the second integrated circuit chip 1320 includes communication units on both sides of the first integrated circuit chip 1310 and the third integrated circuit chip 1330. Note that assuming the first to third integrated circuit chips have the same arrangement, each of the first integrated circuit chip 1310 and the third integrated circuit chip 1330 uses only one interface out of two.

The arrangement of the first integrated circuit chip 1310 will be now be described. Reference numeral 1313 denotes a boot vector setting terminal. Reference numeral 1314 denotes a CPU activation mode setting terminal. Reference numeral 1316 denotes a communication mode setting terminal. As shown in FIG. 13, the first integrated circuit chip 1310 is connected to a ROM 1311 and a RAM 1312. This ROM 1311 stores programs of the second integrated circuit chip 1320 and the third integrated circuit chip 1330 in addition to the first integrated circuit chip 1310.

The arrangement of the second integrated circuit chip 1320 will be described. Reference numeral 1323 denotes a boot vector setting terminal. Reference numeral 1324 denotes a CPU activation mode setting terminal. Reference numeral 1325 denotes a communication mode setting terminal on the side of the second integrated circuit chip. Reference numeral 1326 denotes a communication mode setting terminal on the side of the third integrated circuit chip. A ROM is not connected to the second integrated circuit chip 1320 while a RAM 1322 is connected to it.

The arrangement of the third integrated circuit chip 1330 will be described. Reference numeral 1333 denotes a boot vector setting terminal. Reference numeral 1334 denotes a CPU activation mode setting terminal. Reference numeral 1335 denotes a communication mode setting terminal. Again, a ROM is not connected to the third integrated circuit chip 1330 while a RAM 1332 is connected to it.

In the arrangement of FIG. 13, the programs of the second and third second integrated circuit chips 1320 and 1330 are transmitted from the first integrated circuit chip 1310 to the second integrated circuit chip 1320. The first integrated circuit chip 1310 cancels reset of the second integrated circuit chip 1320. The second integrated circuit chip 1320 (a CPU thereof) cancels reset of the third integrated circuit chip 1330 after transmitting the program for the third integrated circuit chip stored in the RAM 1322 to the RAM of the third integrated circuit chip. At this time, the second integrated circuit chip 1320 deletes (releases) the program for the third integrated circuit chip 1330 in the RAM 1322 since it has already been transmitted.

With the above-described arrangement, it can be understood that the number of integrated circuit chips is not limited to three but may be more.

[Sixth Embodiment]

Figure 14:
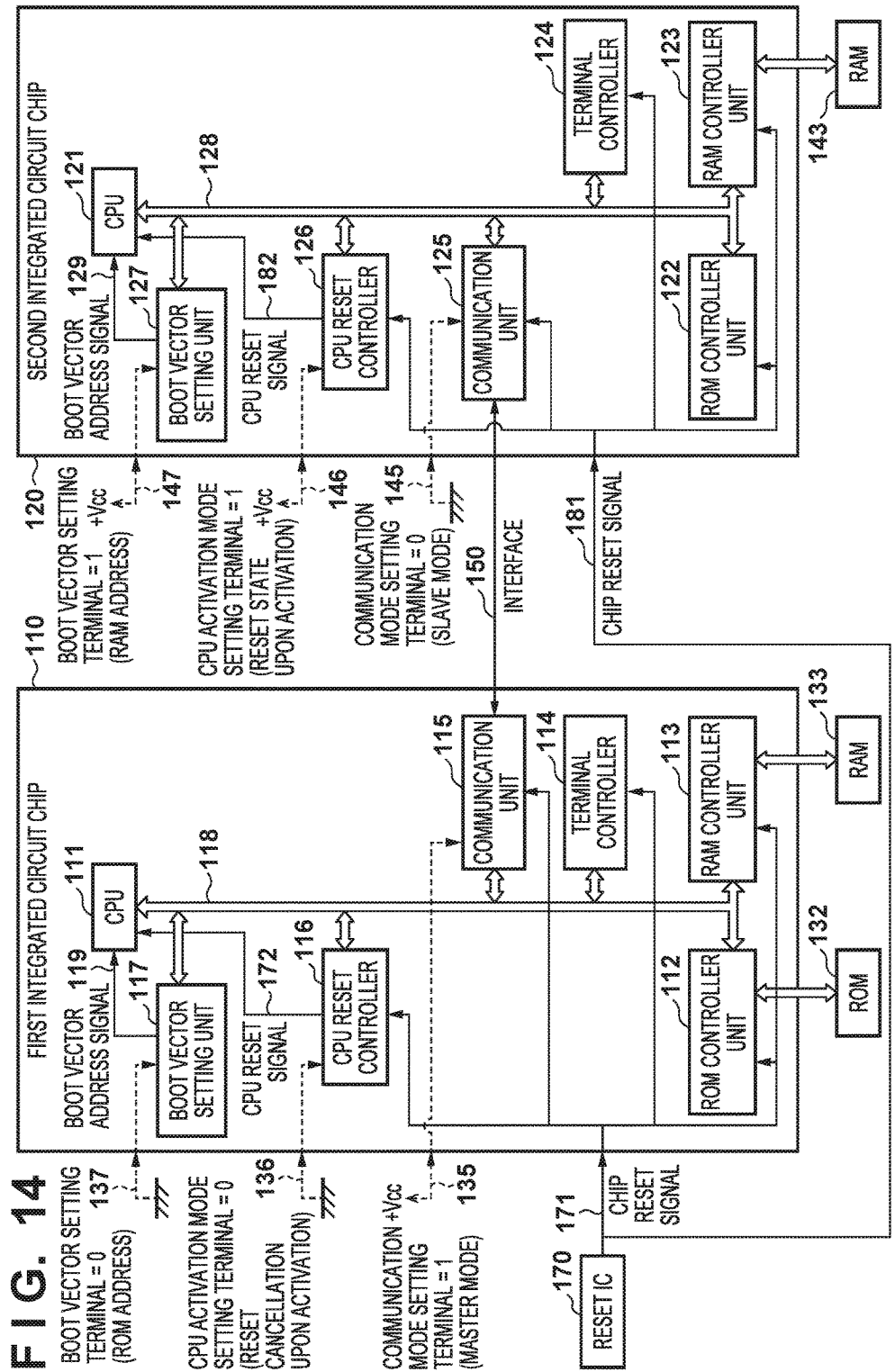
FIG. 14 is a block diagram showing the arrangement of an information processing system according to the sixth embodiment.

In the sixth embodiment, an example will be described in which a system having a different reset system from those in the first to fifth embodiment is used. FIG. 14 is a block diagram showing the arrangement of an information processing system according to the sixth embodiment.

As shown in FIG. 14, a chip reset signal 171 of a first integrated circuit chip 110 is used as a chip reset signal 181 of a second integrated circuit chip 120. With this arrangement, in the first embodiment, the arrangement is possible in which step S515 is performed at the timing of step S501 without performing step S505 in a control procedure of FIG. 5.

[Seventh Embodiment]

Figure 15:
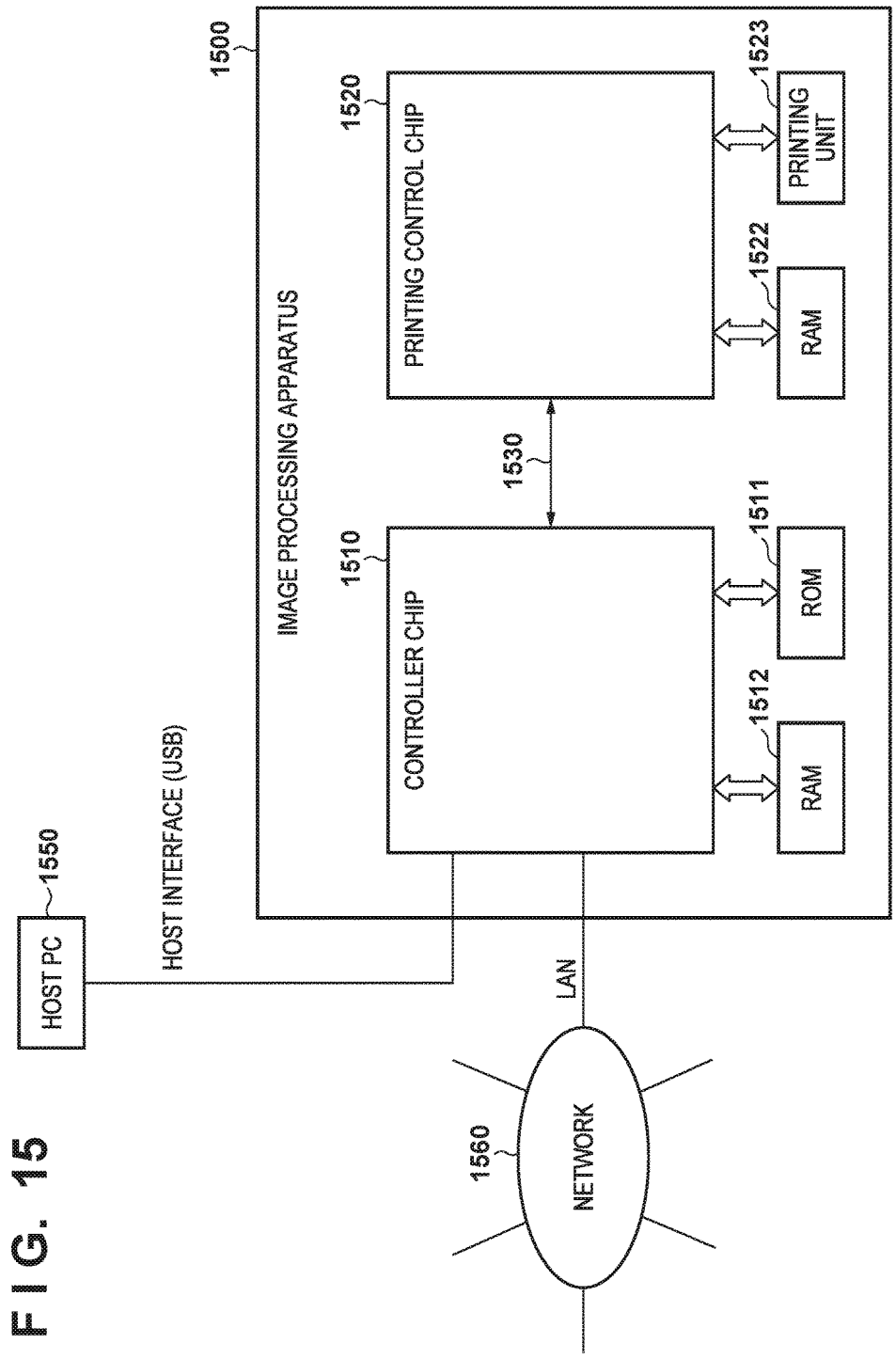
FIG. 15 is a block diagram showing the arrangement of an image processing apparatus according to the seventh embodiment.

In the seventh embodiment, an example will be described in which chips are mounted in an image processing apparatus 1500 including image processing. FIG. 15 is a block diagram showing the arrangement of that image processing apparatus. As shown in FIG. 15, the image processing apparatus 1500 is connected to a host computer 1550 serving as a print data generation source and a network 1560.

The image processing apparatus 1500 includes a controller chip 1510 and a printing control chip 1520. A ROM 1511 is connected to the controller chip. A RAM 1512 is connected to the controller chip. A RAM 1522 is connected to the printing control chip. A printing unit 1523 conveys a head connected to the printing control chip, paper, and the like, and is connected to a communication unit or a terminal controller of the printing control chip 1520. Reference numeral 1560 denotes the network.

In this arrangement example, the controller chip 1510 serves as the first integrated circuit chip and the printing control chip serves as the second integrated circuit chip, each of which has been described above in the first to sixth embodiments. By performing control in the first to sixth embodiments, the ROM is connected to only the controller chip, allowing even a reduction in terminals of the printing control chip 1520 and a cost reduction.

Such an apparatus using the present invention is not limited to the image processing apparatus. For example, even an information processing apparatus such as a personal computer or a special industrial apparatus falls within the scope of the present invention as long as it uses a plurality of chips and performs control applicable to the invention.

In this specification, the arrangement has been described in which identical integrated circuit chips are used in a master/slave system. However, the present invention is not limited to this arrangement. That is, the integrated circuit chip configured to select between the master and the slave by a system, and a system configured to change the activation timing of a CPU (processor) in a mode fall within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-106731, filed May 26, 2015, which is hereby incorporated by reference herein in its entirety.

What is claimed is:

1. An integrated circuit chip which incorporates a processor, and can be connected to a ROM and a RAM, the chip comprising:
   a communication unit configured to communicate with another integrated circuit chip; and
   a reset controller which includes a register storing initial data for setting the processor in a reset state, and is configured to select, based on a logical level of an external terminal, processing to be performed between a first processing to provide the data of the register to a reset terminal of the processor and a second processing to provide an external signal to the reset terminal of the processor,
   wherein, if the integrated circuit chip is connected to the RAM and the ROM which stores a program to be executed by the integrated circuit chip and another integrated circuit chip to be connected, the processor of the integrated circuit chip
   performs an activation process in accordance with the program of the connected ROM,
   communicates with the other integrated circuit chip via the communication unit,
   transmits, via the communication unit, the program for the other integrated circuit chip stored in the ROM to the RAM connected to the other integrated circuit chip, and
   causes the processor of the other integrated circuit chip to perform activation based on the program stored in the RAM by storing data indicating reset cancellation in the register of the reset controller of the other integrated circuit chip via the communication unit.

2. The chip according to claim 1, further comprising a setting unit configured to generate and set, in accordance with a setting, a vector address of one of the ROM and the RAM as a memory storing a program to be executed; and
   wherein the setting unit includes a first switching unit configured to provide, in accordance with the logical level of the external terminal, the vector address of one of the ROM and the RAM to the processor.

3. The chip according to claim 1, wherein the reset controller includes a second switching unit configured to switch, based on the logical level of the external terminal, between the first processing and the second processing.

4. The chip according to claim 1, wherein the communication unit incorporates a DMA controller configured to perform data transmission as a bus master.

5. The chip according to claim 1, wherein the processor in the integrated circuit chip connecting to the RAM and the ROM causes the processor of the other integrated circuit chip to perform activation based on the program stored in the RAM by storing data indicating reset cancellation after the program for the other integrated circuit chip stored in the ROM is transmitted to the RAM connected to the other integrated circuit chip.

6. The chip according to claim 1, wherein the other integrated circuit chip is connected to a print unit.

7. The chip according to claim 1, wherein the integrated circuit chip connecting to the RAM and the ROM and the other integrated circuit chip are included in a device.

8. A method in an integrated circuit chip which incorporates a processor, and can be connected to a ROM and a RAM, wherein the integrated circuit chip includes a communication unit configured to communicate with another integrated circuit chip, and a reset controller which includes a register storing initial data for setting the processor in a reset state, and is configured to control reset of the integrated circuit chip,
   the method comprising:
   selecting, based on a logical level of an external terminal, between whether to provide the data of the register to a reset terminal of the processor and whether to provide an external signal to the reset terminal of the processor in the reset controller,
   wherein, if the integrated circuit chip is connected to the RAM and the ROM which stores a program to be executed by the integrated circuit chip and another integrated circuit chip to be connected, the method further comprises:
   in the processor of the integrated circuit chip,
   performing an activation process in accordance with the program of the connected ROM;
   communicating with the other integrated circuit chip via the communication unit;
   transmitting, via the communication unit, the program for the other integrated circuit chip stored in the ROM to the RAM connected to the other integrated circuit chip; and
   causing the processor of the other integrated circuit chip to perform activation based on the program stored in the RAM by storing data indicating reset cancellation in the register of the reset controller of the other integrated circuit chip via the communication unit.

9. The method according to claim 8, further comprising generating, in accordance with a setting, a vector address of one of the ROM and the RAM as a memory storing a program to be executed, in accordance with the logical level of the external terminal.

10. The method according to claim 8, wherein the reset controller switches, based on the logical level of the external terminal, between whether to provide the data of the register to the reset terminal of the processor and whether to provide the external signal to the reset terminal of the processor.

11. The method according to claim 8, wherein the communication unit incorporates a DMA controller configured to perform data transmission as a bus master.

12. The method according to claim 8, wherein the processor in the integrated circuit chip connecting to the RAM and the ROM causes the processor of the other integrated circuit chip to perform activation based on the program stored in the RAM by storing data indicating reset cancellation after the program for the other integrated circuit chip stored in the ROM is transmitted to the RAM connected to the other integrated circuit chip.

13. The method according to claim 8, wherein the other integrated circuit chip is connected to a print unit.

14. The method according to claim 8, wherein the integrated circuit chip connecting to the RAM and the ROM and the other integrated circuit chip are included in a device.

\* \* \* \* \*